US012605991B2

(12) United States Patent
Lamprey et al.

(10) Patent No.: US 12,605,991 B2
(45) Date of Patent: Apr. 21, 2026

(54) VEHICLE DOOR INCLUDING SENSOR ATTACHMENT SCHEME

(71) Applicant: Honda Motor Co., Ltd., Tokyo (JP)

(72) Inventors: Timothy Lamprey, Hilliard, OH (US); David Rose, West Mansfield, OH (US); Timothy J. Rupp, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 22 days.

(21) Appl. No.: 18/544,343

(22) Filed: Dec. 18, 2023

(65) Prior Publication Data

US 2025/0196595 A1 Jun. 19, 2025

(51) Int. Cl.
*B60J 5/04* (2006.01)
*B60R 16/02* (2006.01)

(52) U.S. Cl.
CPC .......... *B60J 5/0413* (2013.01); *B60J 5/0415* (2013.01); *B60J 5/0463* (2013.01); *B60J 5/0468* (2013.01); *B60R 16/0215* (2013.01); *E05Y 2400/54* (2013.01)

(58) Field of Classification Search
CPC .............. B60R 21/0136; B60R 21/013; B60R 2021/0006; B60R 19/483; B60R 16/0215; B60R 25/2054; E05Y 2400/53; E05Y 2400/54; E05Y 2400/532; E05Y 2400/36; B60J 5/0468; B60J 5/0413; B60J 5/0415; B60J 5/0463; E05F 15/40; E05F 15/73
See application file for complete search history.

(56) References Cited

U.S. PATENT DOCUMENTS

| | | | |
|---|---|---|---|
| 7,234,764 B2 | 6/2007 | Aizawa et al. | |
| 7,614,685 B2 | 11/2009 | Oka | |
| 7,837,255 B1 | 11/2010 | Okutsu et al. | |
| 9,718,330 B2 | 8/2017 | Kindaichi et al. | |
| 10,195,926 B2 | 2/2019 | Sugie | |
| 11,292,396 B2* | 4/2022 | Hwang | G01S 7/027 |
| 2009/0158668 A1 | 6/2009 | Nonaka et al. | |

(Continued)

FOREIGN PATENT DOCUMENTS

| | | |
|---|---|---|
| JP | 5737132 B2 | 6/2015 |
| JP | 6765230 B2 | 10/2020 |

(Continued)

*Primary Examiner* — Justin B Rephann
(74) *Attorney, Agent, or Firm* — KENEALY VAIDYA LLP

(57) ABSTRACT

The presently disclosed subject matter includes a vehicle door that can include two separate panels (an inner panel and an outer panel) for providing a trim finish for the door. The door can include an exterior panel that includes a first outer surface, the inner panel mounted onto the first outer surface The outer panel can be mounted onto and cover the inner panel. The outer panel can have a second outer surface, and the outer panel can cover a first portion of the first outer surface and expose a second portion of the first outer surface such that the second outer surface and the second portion of the first outer surface form an exterior surface of the vehicle door. A plurality of connectors can be fixed to and protrude from the inner panel and be connected to the exterior panel. A sensor can be mounted on the inner panel.

19 Claims, 4 Drawing Sheets

(56)        References Cited

U.S. PATENT DOCUMENTS

| | | | |
|---|---|---|---|
| 2009/0198418 A1* | 8/2009 | Itoga | B60R 21/0136 |
| | | | 701/46 |
| 2012/0123649 A1* | 5/2012 | Eggers | B60R 13/07 |
| | | | 701/49 |
| 2018/0065545 A1* | 3/2018 | McMahon | E05F 15/73 |
| 2018/0170309 A1* | 6/2018 | McMahon | B60Q 1/503 |
| 2019/0162822 A1* | 5/2019 | Rafrafi | G01S 13/56 |
| 2020/0298777 A1* | 9/2020 | Lund | B60R 19/483 |
| 2023/0202569 A1 | 6/2023 | Kovie et al. | |
| 2023/0235609 A1 | 7/2023 | Nguyen et al. | |
| 2024/0142593 A1* | 5/2024 | Tokudome | B60J 5/0493 |

FOREIGN PATENT DOCUMENTS

| | | |
|---|---|---|
| KR | 102263640 B1 | 6/2021 |
| KR | 20210124822 A | 10/2021 |
| WO | 2021001218 A1 | 1/2021 |
| WO | 2021075565 A1 | 4/2021 |
| WO | 2022176669 A1 | 8/2022 |

* cited by examiner

VEHICLE DOOR INCLUDING SENSOR ATTACHMENT SCHEME

BACKGROUND

The disclosed subject matter relates to a sensor attachment scheme of a vehicle door. More particularly, the disclosed subject matter relates to methods and apparatus that can use a two-piece lower garnish of a vehicle door to mount a sensor and conceal the sensor from view from the outside of the vehicle.

A vehicle door can include an exterior panel (also referred to as a door skin) and a main panel that are connected together and define a space into which the window can be retracted. The vehicle door can include an ornamental door garnish that is mounted onto the exterior panel at the lower end of the door that can enhance the aesthetic appearance of the exterior of the door.

A vehicle model can include a plurality of different trim levels. Is some vehicle model lines, the door garnish can be unique for each trim level to differentiates one trim level from a different trim level. In other vehicle models, the door garnish can be the same for each trim level.

The door garnish can be a one-piece construction that has an exterior surface that forms a portion of the exterior surface of the vehicle door. In some vehicle models, he exterior surface of the door garnish can be painted the same color as the exterior surface of the door skin. In other vehicle models, the exterior surface of the door garnish can have a different color and/or a different texture as compared to the exterior surface of the door skin.

The door garnish can be a one-piece plastic construction that includes one or more structures for securing the door garnish to the door skin. Each of these structures can be referred to as a doghouse. The doghouse can protrude from the inner surface of the door garnish and can include a roof that is spaced away from the inner surface. A separate clip can be fixed to the roof of each doghouse and can engage a hole in the exterior panel, thereby securing the door garnish to the exterior panel. Each doghouse can be integrally molded with the inner surface of the door garnish. Thus, the doghouse can provide a mounting structure for the clip and the door garnish can conceal the clip from view from a location that is outside of the vehicle.

The door garnish can include one or more structures that assist installation of the door garnish onto the door skin. Each of these structures can be referred to as a datum. The door skin can include a corresponding number of mating datums that engage the datum(s) on the door garnish. The datum(s) on the door garnish can be integrally molded with the inner surface of the door garnish.

SUMMARY

Some embodiments are directed to a vehicle door that can include an exterior, an inner panel, an outer panel, a plurality of connectors, and a sensor. The exterior panel can include a first outer surface and the inner panel can be mounted onto the first outer surface. The outer panel can be mounted onto and cover the inner panel and can have a second outer surface. The outer panel can cover a first portion of the first outer surface and expose a second portion of the first outer surface such that the second outer surface and the second portion of the first outer surface form an exterior surface of the vehicle door. The plurality of connectors can be fixed to and protrude from the inner panel and connected to the exterior panel. The sensor can be mounted on the inner panel.

Some embodiments are directed to a vehicle door that includes an exterior panel, an inner panel, an outer panel, a plurality of connectors, a sensor housing and a sensor. The exterior panel can include an upper edge, a lower edge, and first outer surface. The exterior panel can terminate at the upper edge and the lower edge and the first outer surface can extend from the upper edge to the lower edge. The inner panel can be mounted onto the exterior panel, adjacent to the lower edge, and spaced away from the upper edge. The outer panel can be mounted onto and cover the inner panel. The outer panel can be spaced away from the upper edge and have an outer panel outer surface that covers a first portion of the first outer surface and exposes a second portion of the first outer surface such that the outer panel outer surface and the second portion of the first outer surface form an exterior surface of the vehicle door. The plurality of connectors can be fixed to and protrude from the inner panel and connected to the exterior panel. The sensor housing can be mounted onto the inner panel and against the outer panel, and the sensor can be mounted within the sensor housing.

Some embodiments are directed to a vehicle door that can include an exterior panel, an inner panel, an outer panel, a plurality of connectors, a sensor housing and a sensor. The exterior panel can include an upper edge, a lower edge and a first exterior surface. The upper edge can be configured to be adjacent to a window pane and the exterior panel can terminate at the upper edge. The exterior panel can terminate at the lower edge. The first exterior surface can extend from the upper edge to the lower edge. The inner panel can be mounted onto the exterior panel and extend along the first exterior surface. The outer panel can be mounted onto the inner panel and include a first edge and a second exterior surface. The first edge can be spaced away from the upper edge and the lower edge. The outer panel can cover the inner panel and a first portion of the first exterior surface that extends from the lower edge to the first edge. The outer panel can expose a second portion of the first exterior surface that extends from the upper edge to the first edge. The second exterior surface and the second portion of the first exterior surface can collectively form an exterior surface of the vehicle door. The plurality of connectors can be fixed to and protrude from the inner panel and connected to the exterior panel. The sensor housing can be adjacent the inner panel and the sensor can be located within the sensor housing.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figures 1, 2:
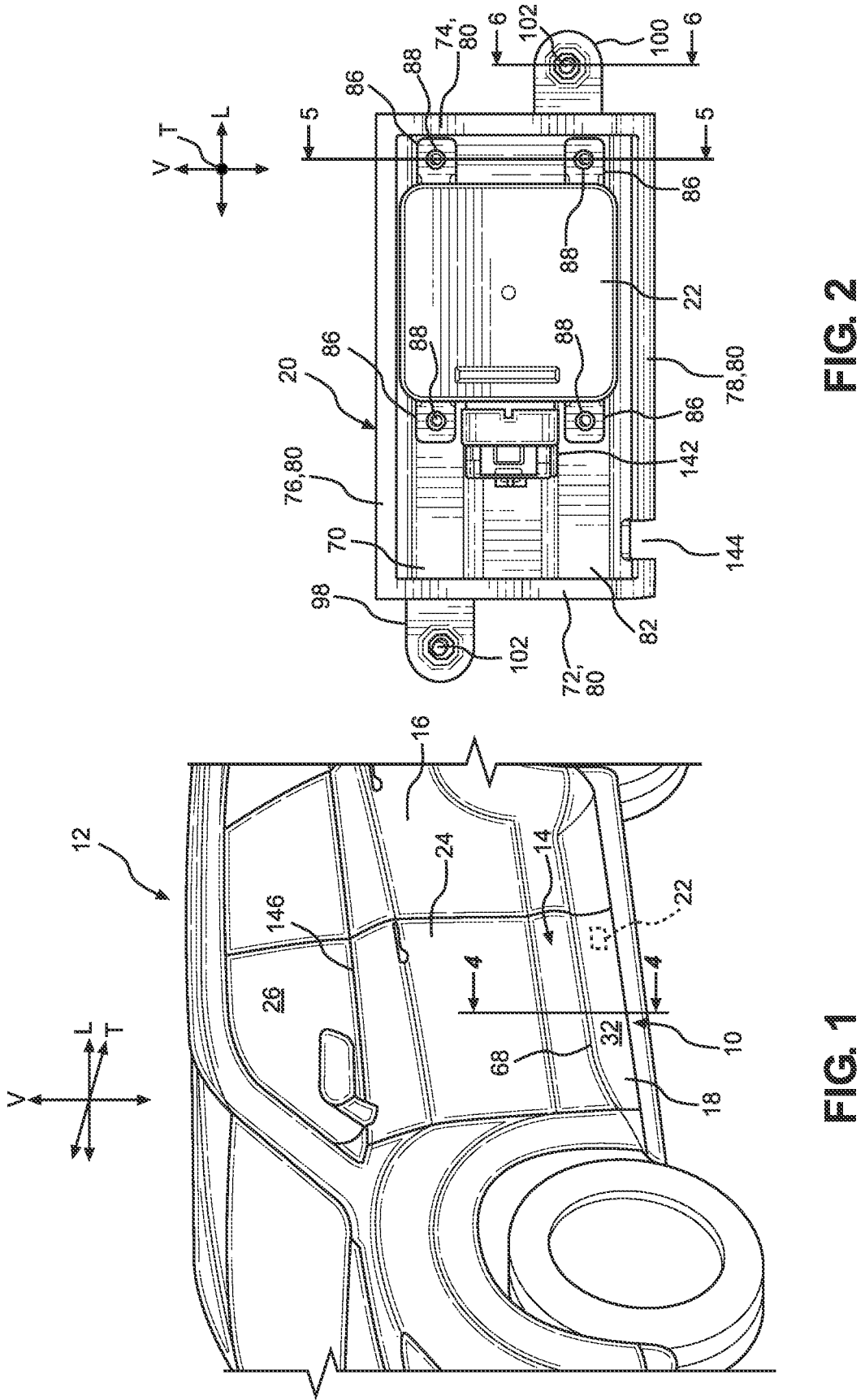
FIG. 1 is a perspective view of a front portion of a vehicle that includes a door sensor attachment scheme made in accordance with principles of the disclosed subject matter.
FIG. 2 is a plan view of a sensor that is mounted onto a door of the vehicle of FIG. 1.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

A vehicle can include one of more electrical/electronic systems such as, but not limited to, navigation, wireless network, V2X, adaptive cruise control, lane keeping assistance, traction/stability control, keyless entry, security, weather monitoring, airbag deployment, and/or other system(s) that can include at least one sensor. It is possible to mount one or more of the sensors on or inside one or more doors of the vehicle.

However, it can be difficult to find sufficient room for the sensor in the space between the door skin and the main panel. Further, this space can be difficult to access in order to install the sensor in this space.

It can be advantageous to mount the sensor in a space between the door skin and the one-piece door garnish. This space can be more easily accessible as compared to the space between the door skin and the main panel. Further, the door garnish can conceal the sensor from the view of an observer outside of the vehicle.

However, the one-piece door garnish can include structures such as, but not limited to, the doghouses and the datums, and these structures can limit the amount of space that is available for mounting the sensor. When molded from plastic or other appropriately moldable material, the molds for the one-piece door garnish can be complex in order to form the doghouses, datums and sensor mounting structure(s).

Further, the additional mounting structure(s) can adversely impact how the molding material flows through and cools inside the mold. These adverse molding conditions can decrease the part quality to a level that is less than a predetermined acceptable level, and/or create paint defects. Thus, adding sensor mounting structure(s) to the inner surface of the door garnish can adversely impact the fit and finish of the lower door garnish.

Instead of adding a mounting structure of the sensor to an existing one-piece garnish, one or more of the doghouses and/or datums could be replaced with the sensor mounting structure. However, omitting one or more of the doghouses can adversely impact the quality of the connection between the door garnish and door skin. Omitting one or more of the datums can adversely impact the desired orientation of the door garnish with respect to the exterior panel and/or the other parts of the vehicle that are adjacent to or near the lower door garnish.

Thus, there is a need for a vehicle door that includes a sensor attachment scheme that can mount and conceal the sensor without adversely impacting the quality of the overall fit and finish of the vehicle door as well as the fit and finish of each of its components.

FIG. 1 illustrates an embodiment of a sensor attachment scheme 10 for a vehicle 12 made in accordance with principles of the disclosed subject matter. The sensor attachment scheme 10 can mount and conceal a sensor without adversely impacting the quality of the fit and finish of the vehicle door 14 and each of its components.

Figure 3:
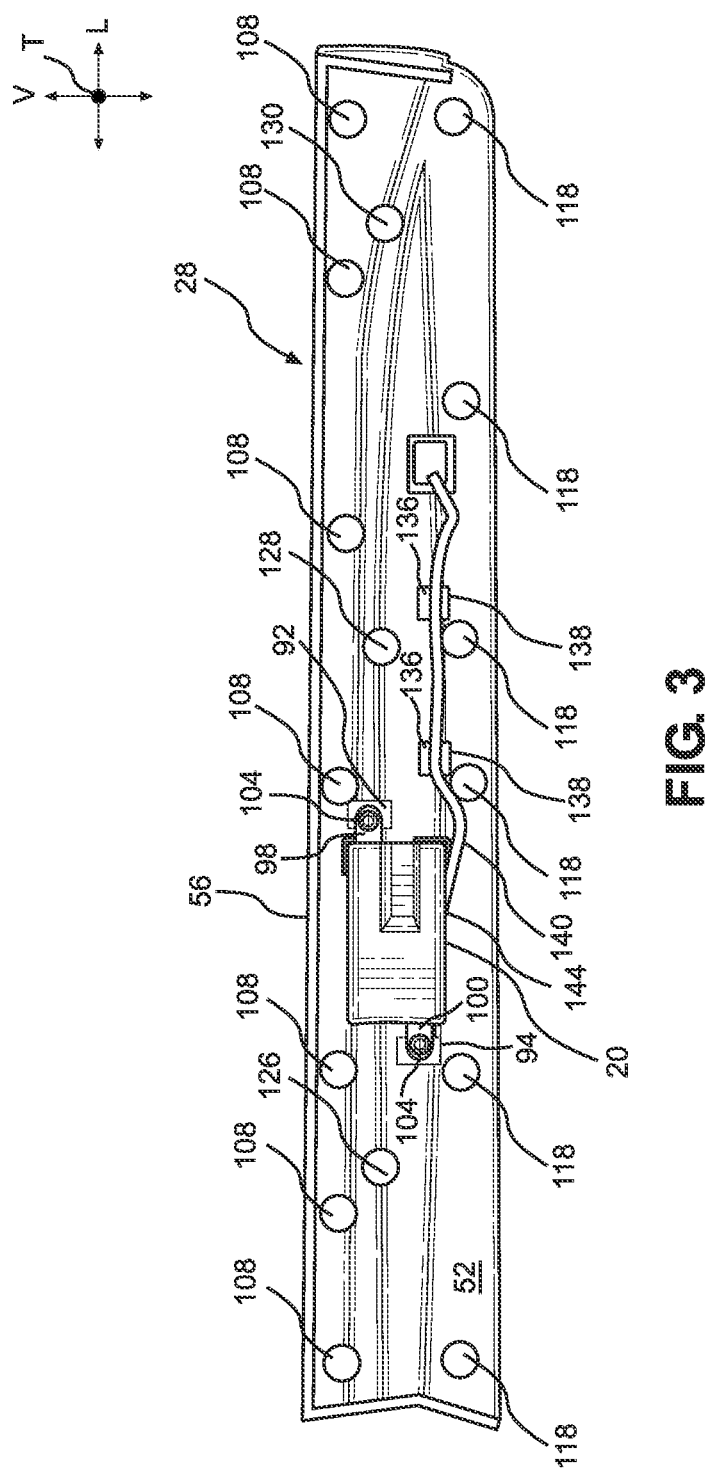
FIG. 3 is a plan view of an inner panel and a sensor assembly of the sensor attachment scheme of FIG. 1.

The vehicle 12 can extend in a longitudinal direction L, a transverse direction T and a vertical direction V. The vehicle door 14 can be a front door and the vehicle 12 can include a rear door 16 and, for example, a sensor 22. The front door 14 can be connected to a motor than can open and close the front door 14 and the exemplary sensor 22 can be a type of sensor referred to as a power hinge door sensor that is configured to output a signal that is indicative of the presence or the absence of an object in the path of the front door 14 when the front door 14 is opening or closing. The object can be, but it not limited to, a pedestrian, another vehicle, a tree, a fence, a hydrant, etc. The sensor 22 can be electrically connected to a processor-based controller that is configured to automatically regulate the motor based on the data the controller receives from the sensor 22. The front door 14 can include the sensor attachment scheme 10. The sensor attachment scheme 10 can include a door garnish 18 (FIGS. 1 and 4) and a sensor housing 20 (FIGS. 2 and 3). The sensor 22 can be mounted in the sensor housing 20.

The front door 14 can include an exterior panel 24 (also referred to as a door skin) and a front window 26. The door garnish 18 can be mounted onto the exterior panel 24 and spaced away from the front window 26. The door garnish 18 can be located on the lower end of the front door 14 and can be referred to as a lower door garnish, a trim panel, a door trim, a body cladding or a door cladding.

Figure 4:
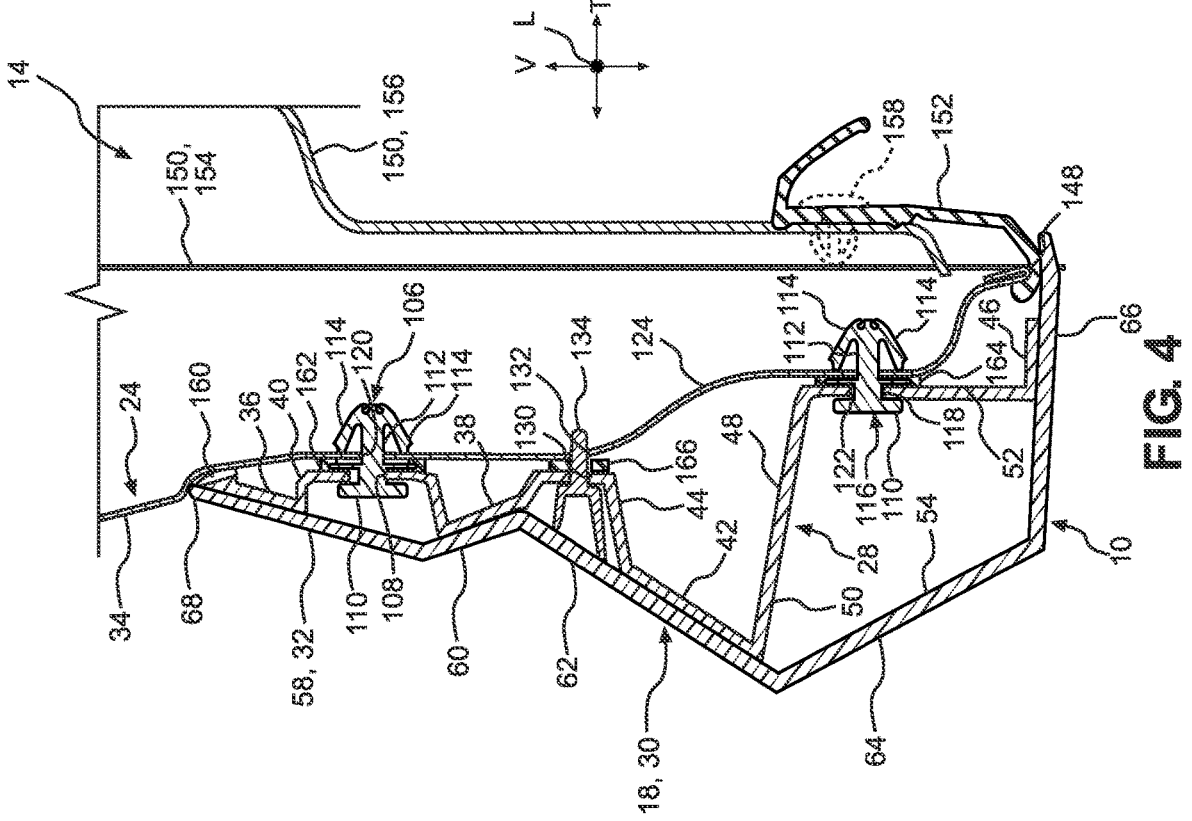
FIG. 4 is a cross-sectional view taken in the direction of section line 4-4 of FIG. 1.

Referring to FIG. 4, the door garnish 18 can include an inner panel 28 and an outer panel 30. The outer panel 30 and the exterior panel 24 can enclose the inner panel 28 so that it is concealed from view from outside of the vehicle 12. The outer panel 30 can include an exterior surface 32 and the exterior panel 24 can include an exterior surface 34. Together, the exterior surfaces 32, 34 can form the exterior surface of the front door 14.

The inner panel 28 can include mounting structure that connects the door garnish 18 to the exterior panel 24 and mounting structure that connects the sensor housing 20 to the door garnish 18. Since the inner panel 28 is concealed from view, any surface defects caused by the mounting structures are not visible from a location that is outside of the vehicle 12. Thus, the mounting structures cannot adversely impact the aesthetic appearance of the exterior surface 32 of the outer panel 30 and the mounting scheme 10 can connect the sensor 22 to the remainder of the front door 14.

The inner panel 28 can include an outer surface 50 that generally faces the outer panel in the transverse direction T of the vehicle 12 and an inner surface 52 that generally faces the exterior panel 24. At least a portion of the outer surface 50 can face the outer panel 30 in the transverse direction T, and at least a portion of the inner surface 52 can face the exterior panel 24 in the transverse direction T.

The outer panel 30 can include an inner surface 54 that generally faces the outer surface 50. At least a portion of the inner surface 54 can face the outer surface 50 of the inner panel 28 in the transverse direction T. Portions of the outer surface 50 of the inner panel 28 can abut the inner surface 54 of the outer panel 30.

Referring to FIG. 3, an adhesive tape 56 can secure the outer panel 30 to the inner panel 28. The adhesive tape 56 can be a double-sided tape with adhesive on both sides. The adhesive tape 56 can be applied to the inner panel 28, and the outer panel 30 can be applied to the adhesive tape 56 that is adhered to the inner panel 28. The adhesive tape 56 can be applied to one or more of the portions of the outer surface 50 of the inner panel 28 that abuts the inner surface 54 of the outer panel 30.

Each of the panels 28, 30 can be formed as a one-piece, homogenous, single material contoured wall. The contour of the outer panel 30 can be configured to enhance the aesthetic appearance of the outer surface 32. The contour of the inner panel 28 can be compatible to the contour of the outer panel 30 and can enhance the rigidity of the door garnish 18. The panels 28, 30 can be formed from any appropriate material such as, but not limited to plastic, fiberglass, carbon fiber, fiber-reinforced plastic, sheet molding compound, sheet metal, steel, aluminum, or aluminum alloy.

The inner panel 28 can include a plurality of wall portions 36, 38, 40, 42, 44, 46, 48 that form the contoured wall. The surfaces 50, 52 can extend along all of the wall portions 36, 38, 40, 42, 44, 46, 48. Each of the first wall portion 36, the second wall portion 38, the fourth wall portion 42 and the sixth wall portion 46 can have a linear shape when viewed in a cross-section that is taken along the transverse direction T of vehicle 12, as shown in FIG. 4. Each of the third wall portion 40, the fifth wall portion 44 and seventh wall portion 48 can include a plurality of linear segments, as viewed in cross-section of FIG. 4. Each of the wall portions 36, 38, 40, 42, 44, 46, 48 can be straight and/or curved as the wall portions 36, 38, 40, 42, 44, 46, 48 extend in the longitudinal direction L of the vehicle 12.

The first wall portion 36 and the second wall portion 38 can abut the outer panel 30 and be spaced away from each other along the vertical direction V of the vehicle 12. The first wall portion 36 and the second wall portion 38 can extend in different directions. That is, the first wall portion 36 and the second wall portion 38 can extend in respective directions that intersect each other, as viewed in FIG. 4. The first wall portion 36 and the second wall portion 38 can extend in respective directions that intersect each of the transverse direction T and the vertical direction V of the vehicle 12, as viewed in FIG. 4.

The third wall portion 40 can extend from each of the first wall portion 36 and the second wall portion 38. The third wall portion 40 can protrude from the first wall portion 36 and the second wall portion 38 and be spaced away from the outer panel 30 along the transverse direction T of the vehicle 12. The third wall portion 40 can be referred to as a raised wall portion.

The fourth wall portion 42 can abut the outer panel 30 and can be spaced away from the second wall portion 38 along the vertical direction V of the vehicle 12. The fourth wall portion 42 can extend in a direction that intersections the respective directions in which the first and second wall portions 36, 38 extend, as viewed in FIG. 4. The fourth wall portion 42 can extend in a direction that intersects each of the transverse direction T and the vertical direction V of the vehicle 12, as viewed in FIG. 4.

The fifth wall portion 44 can extend from each of the second wall portion 38 and the fourth wall portion 42. The fifth wall portion 44 can protrude from the second wall portion 38 and the fifth wall portion 44 can be spaced away from the outer panel 30 along the transverse direction T of the vehicle 12. The fifth wall portion 44 can be referred to as a raised wall portion.

The sixth wall portion 46 can abut the outer panel 30 and be spaced away from the fourth wall portion 42 along the vertical direction V of the vehicle 12. The sixth wall portion 46 can extend in a direction that intersects the respective directions in which each of the first wall portion 36, the second wall portion 38 and the fourth wall portion 42 extends, as viewed in FIG. 4. The sixth wall portion 46 can extend along the transverse direction T of the vehicle 12.

The seventh wall portion 48 can extend from each of fourth wall portion 42 and the sixth wall portion 46. The seventh wall portion 48 can protrude from the fourth wall portion 42 and the sixth wall portion 46 and be spaced away from the outer panel 30 along the transverse direction T of the vehicle 12. The seventh wall portion 48 can be referred to as a raised wall portion.

The outer panel 30 can include a plurality of wall portions 58, 60, 62, 64, 66. Each of the wall portions 58, 60, 62, 64, 66 can have a linear shape when viewed in a cross-section that is taken along the transverse direction T of vehicle 12, as shown in FIG. 4. Each of the wall portions 58, 60, 62, 64, 66 can be straight and/or curved as the wall portions 58, 60, 62, 64, 66 extend in the longitudinal direction L of the vehicle 12.

The first wall portion 58 can extend parallel to and abut the first wall portion 36 of the inner panel 28. The first wall portion 58 can extend in a direction that intersects the direction in which the second wall portion 60 extends, as viewed in FIG. 4. The first wall portion 58 can extend in a direction that intersects the transverse direction T and the vertical direction V of the vehicle 12. The first wall portion 58 can be spaced away from the third wall portion 40 of the inner panel 28 in the transverse direction T of the vehicle 12.

The first wall portion 58 can include an upper edge 68 of the outer panel 30. The upper edge 68 can be adjacent to the exterior surface 34 of the exterior panel 24. The upper edge 68 can be the furthest extent of the door garnish 18 in the vertical direction V of the vehicle 12.

The second wall portion 60 can extend parallel to and abut the second wall portion 38 of the inner panel 28. The second wall portion 60 can extend from each of the first wall portion 58 and the third wall portion 62. The second wall portion 60 can extend in a direction that intersects the direction in which the third wall portion 62 extends, as viewed in FIG. 4. The second wall portion 60 can extend in a direction that intersects the transverse direction T and the vertical direction V of the vehicle 12. The second wall portion 60 can be spaced away from the third wall portion 40 of the inner panel 28 in the transverse direction T of the vehicle 12.

The third wall portion 62 can extend parallel to and abut the fourth wall portion 42 of the inner panel 28. The third wall portion 62 can extend from each of the second wall portion 60 and the fourth wall portion 64. The third wall portion 62 can extend in a direction that intersects the direction in which each of the second wall portion 60 and the fourth wall portion 64 extends, as viewed in FIG. 4. The third wall portion 62 can extend in a direction that intersects the transverse direction T and the vertical direction V of the vehicle 12. The third wall portion 62 can be spaced away from the fifth wall portion 44 of the inner panel 28 in the transverse direction T of the vehicle 12.

The fourth wall portion 64 can extend in a direction that intersects the direction in which each of the third wall portion 62 and the fifth wall portion 66 extends, as viewed in FIG. 4. The fourth wall portion 64 can extend from each of the third wall portion 62 and the fifth wall portion 66. The fourth wall portion 64 can extend in a direction that intersects the transverse direction T and the vertical direction V of the vehicle 12. The fourth wall portion 64 can be spaced away from the seventh wall portion 48 of the inner panel 28 in the transverse direction T of the vehicle 12.

The fifth wall portion 66 can extend parallel to and abut the sixth wall portion 46 of the inner panel 28. The fifth wall portion 66 can extend along the transverse direction T of the vehicle 12.

Returning to FIG. 2, the sensor housing 20 can include a first wall 70, a second wall 72, a third wall 74, a fourth wall 76 and a fifth wall 78. The first wall 70 can extend along the longitudinal direction L of the vehicle 12 and in a direction that intersects the transverse direction T and the vertical direction V of the vehicle 12. The walls 72, 74, 76, 78 can protrude from the first wall 70 generally along the transverse direction T of the vehicle 12. A perimeter edge 80 can extend along each of the walls 72, 74, 76, 78.

The second wall 72 and the third wall 74 can be parallel to each other and spaced away from each other in the longitudinal direction L of the vehicle 12. Each of the second wall 72 and the third wall 74 can extend from both of the fourth wall 76 and the fifth wall 78.

The fourth wall 76 and the fifth wall 78 can be parallel to each other and spaced away from each other in the vertical direction V of the vehicle 12. Each of the fourth wall 76 and the fifth wall 78 can extend from both of the second wall 72 and the third wall 74 along the longitudinal direction L of the vehicle 12.

The walls 70, 72, 74, 76, 78 can bound a space 82 and the sensor 22 can be mounted in the space 82. The sensor housing 20 can include an opening on a side that opposes the first wall 70 so that the sensor 22 can be mounted on the sensor housing 20. The perimeter edge 80 can surround the opening.

Figure 5:
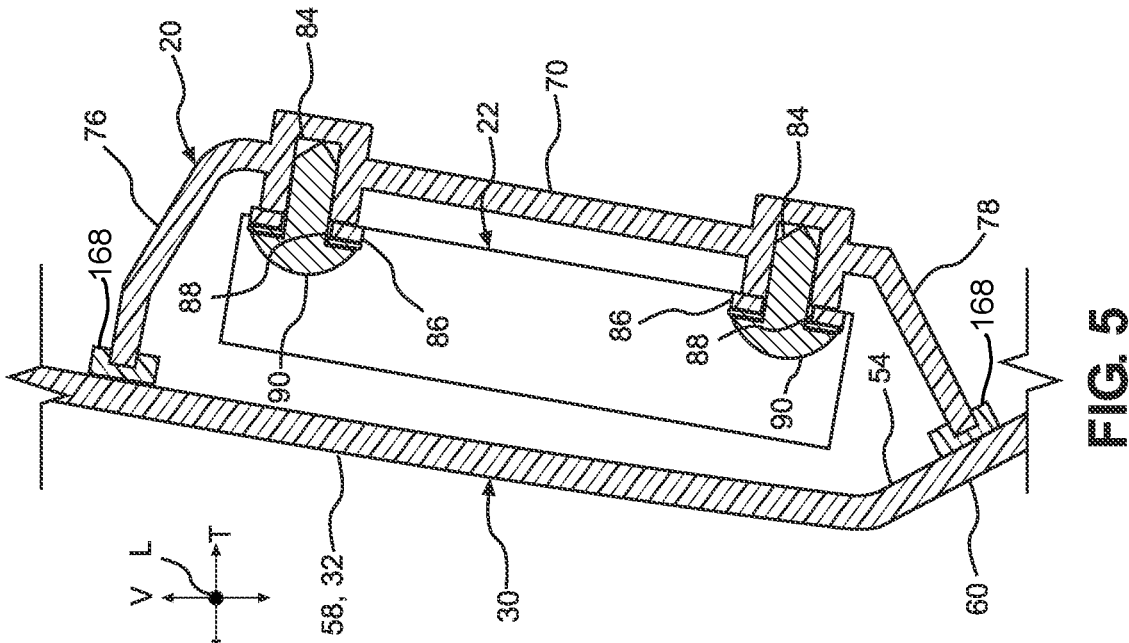
FIG. 5 is a cross-sectional view taken in the direction of section line 5-5 of FIG. 2.

The sensor housing 20 can include a plurality of mounting holes 84 (FIG. 5) and the sensor 22 can include a plurality of tabs 86 (FIGS. 2 and 5). The mounting holes 84 can be blind holes. Each of the tabs 86 can include a through hole 88. Referring to FIG. 5, a respective screw 90 can extend through a respective one of the through holes 88 and into the mounting hole 84 to fix the sensor 22 to the sensor housing 20. The screws 90 can be tapping screws or other known attachment structures.

Figure 6:
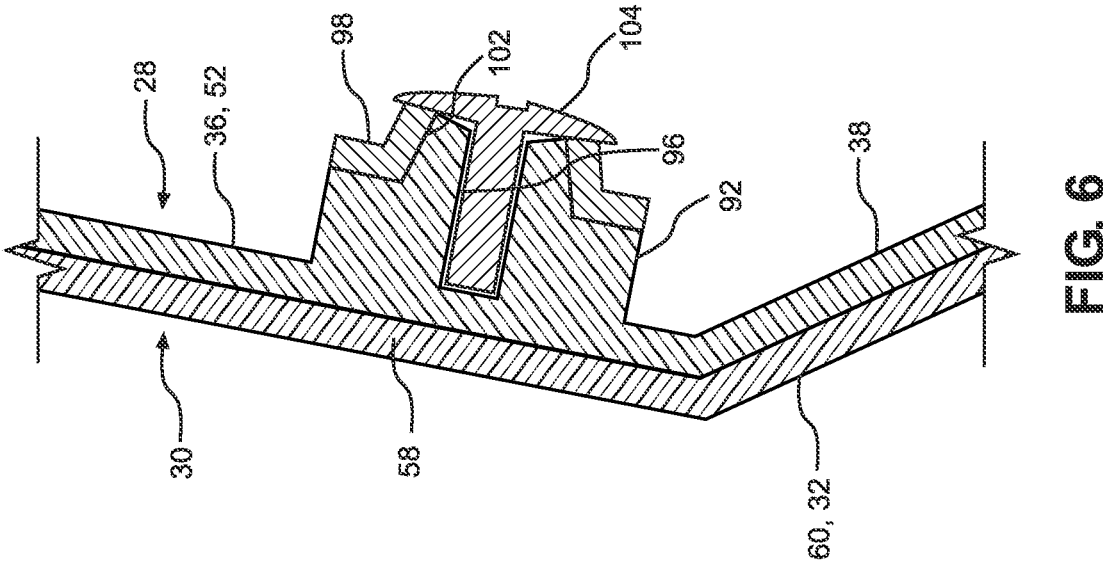
FIG. 6 is a cross-sectional view taken in the direction of section line 6-6 of FIG. 2.

Referring to FIG. 3, the inner panel 28 can include a first mounting protrusion 92 and a second mounting protrusion 94. Referring to FIGS. 3 and 6, the first mounting protrusion 92 can be located on the first wall portion 36 and protrude away from the inner surface 52. The second mounting protrusion 94 can be located on the second wall portion 38 and protrude away from the inner surface 52. The second mounting protrusion 94 can be the same as, or similar to, the first mounting protrusion 92. Referring to FIG. 6, each of the mounting protrusions 92, 94 can include a blind hole 96.

Returning to FIG. 2, the sensor housing 20 can include a pair of mounting tabs 98, 100. Referring to FIG. 6, each of the mounting tabs 98, 100 can have a through hole 102. Each of the through holes 102 can be aligned with a respective one of the blind holes 96. A respective screw 104 can extend through a respective one of the through holes 102 and into a respective one of the blind holes 96 to fix the sensor housing 20 onto the inner panel 28.

Returning to FIG. 5, the sensor attachment scheme 10 can include a material that is adhered to at least one of the perimeter edge 80 of the sensor housing 20 and the inner surface 54 of the outer panel 30. The material can have one more of the following properties: soundproofing, anti-vibration, waterproofing, flame retardant. In alternate embodiments, the material can be ethylene propylene dienetepolymer ("EPT"). The EPT material can be a sealing member 168 between the inner surface 54 and the perimeter edge 80 so that the sensor 22 is sealed against fluid, dust and debris.

The front door 14 can include a plurality of connectors that can connect the door garnish 18 to the exterior panel 24. The connectors can include any appropriate structure such as, but not limited to threaded fasteners, clamps, clips, etc. In FIG. 4, the door garnish 18 can include a plurality of first clips 106 that are mounted on and fixed to the third wall portion 40. Each of the first clips 106 can extend away from the outer panel 30 and toward the exterior panel 24 in the transverse direction T of the vehicle 12. Each of the first clips 106 can be spaced away from the outer panel 30, and the outer panel 30 can conceal the first clips 106 from view from a location that is outside of the vehicle 12.

Each of the first clips 106 can be spaced along the third wall portion 40 in the longitudinal direction L of the vehicle. Referring to FIG. 3, the inner panel 28 can include a plurality of first clip holes 108 that extend through the third wall portion 40 and are spaced apart from each other along the longitudinal direction L of the vehicle 12. Each of the first clips 106 can be inserted into a respective one of the first clip holes 108.

Returning to FIG. 4, the door garnish 18 can include a plurality of second clips 116 that are mounted on and fixed to the seventh wall portion 48. Each of the second clips 116 can extend away from the outer panel 30 and toward the exterior panel 24 in the transverse direction T of the vehicle 12. Each of the second clips 116 can be spaced away from the outer panel 30, and the outer panel 30 can conceal the second clips 116 from view from a location that is outside of the vehicle 12.

Each of the second clips 116 can be spaced along the third wall portion 40 in the longitudinal direction L of the vehicle. Returning to FIG. 3, the inner panel 28 can include a plurality of second clip holes 118 that extend through the seventh wall portion 48 and are spaced apart from each other along the longitudinal direction L of the vehicle 12. Each of the second clips 116 can be inserted into a respective one of the second clip holes 118.

Returning to FIG. 4, each of the first clips 106 and the second clips 118 can include a base 110, a stem 112 and a pair of arms 114. The base 110 can be larger than the clip holes 106, 116 and abut the outer surface 50 of the inner panel 28. The stem 112 can extend through the respective clip hole 106, 116 and protrude away from the inner surface 52 and toward the exterior panel 24. Each of the arms 114 can be cantilevered to the stem 112. Each arm 114 can be elastically deformed when the arm 114 is bent so that the free end moves toward the stem 112.

The exterior panel 24 can include a plurality of first clip holes 120 and a plurality of second clip holes 122. The first clip holes 120 can be aligned with the first clip holes 108 in the inner panel 28 and the second clip holes 122 can be aligned with the second clip holes 118 in the inner panel 28. The stem 112 can extend through the respective one of the clip holes 120, 122 in the exterior panel 24 and the arms 114 can be located adjacent to an inner surface 124 of the exterior panel 24.

The arms 114 of the clips 106, 116 can elastically bend inwardly toward the stem 112 when the clips 106 are inserted into the respective clip holes 108, 118, 120, 122. The arms 114 can elastically return to the spread position shown in FIG. 4 after passing through the respective clip hole 108, 118 during installation of the clip 106, 116 onto the inner panel 28 and after passing through respective clip hole 120, 122 during installation of the door garnish 18 onto the exterior panel 24.

The span between the elastic arms 114 can be larger than the diameter of the clip holes 120, 122. Further, the arms 114 can bend away from the stem 112 if the door garnish 18 moves away from the exterior panel in the transverse direction T of the vehicle 12, thereby further increasing the size of the arms 114 relative to the diameter of the clip holes 120, 122. Thus, the arms 114 can prevent or resist retraction of the clip 106, 116 from the respective clip hole 108, 118.

Referring to FIGS. 3 and 4, the inner panel 28 can include a first through hole 126, a second through hole 128 and a third through hole 130 that extend through the fifth wall portion 44. Referring to FIG. 4, the exterior panel 24 can include a plurality of fourth through holes 132. Each of the fourth through holes 132 can be aligned with a respective one of the through holes 126, 128, 130. The outer panel 30 can include a plurality of projections 134, and each of the projections 134 can extend through a respective one of the through holes 126, 128, 130 in the inner panel 28 and a respective one of the fourth through holes 132 in the exterior panel 24.

The through holes 126, 128, 130, 132 and the projections 134 can facilitate a desired orientation of the door garnish 18 relative to the exterior panel 24 during the process of mounting the door garnish 18 onto the exterior panel 24. Each of the through holes 126, 128, 130, 132 and the projections 134 can be referred to as a datum. The first through hole 126, the third through hole 130, a corresponding pair of the fourth through holes 132 and a corresponding pair of the projections 134 can orient the door garnish 18 in the vertical direction V of the vehicle 12. The second through hole 128, the corresponding one of the fourth through holes 132 and the corresponding one of the projections 134 can orient the door garnish 18 relative to the longitudinal direction L of the vehicle 12.

Referring to FIG. 4, the door garnish 18 can include a strip 160 of foam or tape that extends along the inner surface 54 at the upper end of the inner panel 28. The strip 160 can abut the exterior surface 34 of the exterior panel 24. The strip 160 can be adhered to both of the inner panel 28 and the exterior panel 24.

A first foam pad 162 can be mounted onto the stem 12 of each first clip 106. The first foam pad 162 can abut the inner surface 52 of the inner panel 28 and the exterior surface 34 of the exterior panel 24 to seal the respective first clip holes 108, 120.

A second foam pad 164 can be mounted onto the stem 12 of each second clip 116. The second foam pad 164 can abut the inner surface 52 of the inner panel 28 and the exterior surface 34 of the exterior panel 24 to seal the respective second clip holes 118, 122.

A third foam pad 166 can be mounted onto each of the projections 134. The third foam pad 166 can abut the inner surface 52 of the inner panel 28 and the exterior surface 34 of the exterior panel 24 to seal the respective one of the through holes 126, 128, 130 and a respective one of the through holes 132.

Structures such as, but not limited to, doghouses can be useful for mounting a connector to a panel so that the connector is concealed by the panel. Since the outer panel 30 can obstruct the inner panel 28 from view from the outside of the vehicle 12 and the clips 106, 116 are mounted on the inner panel 28, each of the panels 28, 32 can be devoid of a doghouse. Thus, the molds for making each of the panels 28, 32 can be simpler as compared to the molds for a one-piece door garnish that includes one or more doghouses. Further, the absence of a doghouse on the outer panel 30 can reduce the risk of surface defects on the exterior surface 32 of the outer panel 30 as compared to a door garnish that is made as a single piece (and that possibly includes doghouses).

Referring to FIG. 3, the inner panel 28 can include a plurality of harness clips 136, 138. The first harness clips 136 and the second harness clips 138 can extend away from the inner surface 52 of the inner panel 28. Each of the second harness clips 138 can be spaced away from and oppose a respective one of the first harness clips 136.

A wire harness 140 can be electrically connected to the sensor 22 and extend out of and away from the sensor housing 20. The wire harness 140 can be inserted between the opposing harness clips 136, 138 and the harness clips 136, 138 can hold the wire harness 140 against the inner surface 52 of the inner panel 28. The wire harness 140 can include a ground wire, a power supply wire and one or more a communication wires.

Referring to FIG. 2, the sensor 20 can include an electrical connector 142 and the wire harness 140 can include a mating connector that is physically and electrically connected to the electrical connector 142. The sensor housing 20 can include an opening 144 and the wire harness 140 can extend through the opening 144.

The exterior panel 24 can include an upper edge 146 (FIG. 1) and a lower edge 148 (FIG. 4), and the exterior panel 24 can terminate at the edges 146, 148 in the vertical direction V of the vehicle 12. The upper edge 146 can be adjacent to the front widow 26 and bound a portion of the opening in the front door 14 for the front window 26. The lower edge 148 can form the lower boundary of the exterior panel 24 in the vertical direction V.

The door garnish 18 can be spaced away from the upper edge 146 of the exterior panel in the vertical direction V of the vehicle 12. That is, the upper edge 68 of the outer panel 30 can be located between the upper edge 146 of the exterior panel 24 and the lower edge 148 of the exterior panel 24 in the vertical direction V. Referring to FIG. 4, the door garnish 18 can be adjacent to and below the lower edge 148 in the vertical direction V.

The front door 14 can include a door frame 150 and a lower door seal 152. The door frame 150 can be connected to the exterior panel in any appropriate manner such as, but not limited to, welding, adhesive, mechanical fasteners, or any combination of these structures.

The door frame 150 can include a first frame piece 154 and a second frame piece 156. The first frame piece 154 can be located between the exterior panel 24 and the second frame piece 156 in the transverse direction T of the vehicle 12. The first frame piece 154 can be mounted onto the exterior panel 24 and the second frame piece 156 can be mounted onto the first frame piece 154. The lower door seal 152 can be mounted onto the second frame piece 156 by a plurality of clips 158 shown in phantom. Each of the clips 158 can have the same or similar structure as the first clip 106 and the second clip 116.

The lower door seal 152 can abut the lower edge 148 of the exterior panel 24 and the inner surface 54 of the outer panel 30. The lower door seal 152 can abut the fifth wall portion 66 of the outer panel 30. The lower door seal 152 can form a seal between the fifth wall portion 66 of the outer panel 30 and the lower edge 148.

The sensor mounting scheme 10 can easily mount the sensor 22 onto the exterior panel 24 without adversely affecting the surface quality of exterior surface 32, the door garnish 18, or the quality of the painted finish on the exterior surface 32.

Mounting the sensor housing 20 onto the inner panel 28, sealing the sensor housing 20 against the outer panel 30 and forming all of the harness clips 136, 138 on the inner panel 28 can reduce tooling complexity (no slides for doghouses), can improve part quality, and facilitate the design and engineering of the door garnish 18 to achieve a desired fit and finish.

The inner panel 28 can be designed as a modular component that can be compatible with more than one vehicle model and compatible with minor model changes to the vehicle 12. Thus, the cost of engineering and manufacturing the inner panel 28 can be shared across a larger number of vehicles 12. This can reduce the cost of the inner panel 28.

The separate outer panel 30 can be varied for different vehicle models and trim levels of the same vehicle model. Thus, the sensor mounting scheme 10 can easily mount the sensor 22 onto the exterior panel 24 while providing variability to the aesthetic appearance of the door garnish 18 and the front door 14.

While certain embodiments of the invention are described above, it should be understood that the invention can be embodied and configured in many different ways without departing from the spirit and scope of the invention.

Instead of the screws 104, the sensor housing 20 can be mounted onto the inner panel 28 using other fastening technology such as, but not limited to, clips, snaps, bolts, heat stakes, welds formed by ultrasonic vibrations, or any combination of these technologies.

Instead of the contoured wall shown in FIG. 4, the outer panel 30 can have any appropriate shape to achieve the desired aesthetic appearance for the door garnish 18 and the front door 14.

One or more of the wall portions 36, 38, 40, 42, 44, 46, 48, 58, 60, 62, 64, 66 can have any appropriate shape to achieve the desired fit and finish of the outer panel 30 onto the inner panel 28 and the door garnish 18 onto the exterior panel. In alternate embodiments, any one of the walls portions 36, 38, 42, 46 can be parallel to any of the other wall portions if such an arrangement is complimentary to the contour of the external panel 30.

Instead of the distinct wall portions 58, 60, 62, 64, 66 shown in FIG. 4, the outer panel 30 can be a curved wall with a single curve or a plurality of curves, as viewed in a cross-section taken in the transverse direction T of the vehicle 12. The wall portions 36, 38, 40, 42, 44, 46, 48 of the inner panel can be omitted or reshaped as needed to compliment the shape(s) of the outer panel 30.

Instead of being generally aligned along the longitudinal direction L of the vehicle one or more of the first clip holes 108 can be misaligned with another one of the first clip holes 108 in the longitudinal direction L, and one of the second clip holes 118 can be misaligned with another one of the second clip holes 118 in the longitudinal direction L.

Instead of the clips 106, 116, the door garnish 18 can be connected to the exterior panel 24 by any appropriate mechanical fasteners such as, but not limited to threaded fastener, clamps, mating snap-fitting connectors. In alternate embodiments, the inner panel 28 can be connected to the exterior panel 24 by bolts that are threaded into nuts welded onto the exterior panel 24. The outer panel 30 can be connected to the inner panel 28 after the inner panel 28 is bolted onto the exterior panel 24.

FIGS. 1 and 4 show the door garnish 18 located along the lower portion of the front door 16. However, alternate embodiments can include the door garnish 18 mounted in a central portion of the front door 14 that is spaced away from the lower edge 148 of the exterior panel 24 in the vertical direction B of the vehicle 12 toward the upper edge 146 of the exterior panel 24, or along leading or trailing edges of the door 14, or even adjacent the opening for the front window 26 of the door 14.

Instead of the power hinge door sensor 22, alternate embodiments can include any type of sensor such as, but not limited to, an accelerometer for measuring a side impact force, a lidar sensor, a radar sensor, or a camera.

In alternate embodiments, the adhesive tape 56 can be first applied to the outer panel 30 and subsequently, the inner panel 28 can be applied onto the adhesive tape that is adhered onto the outer panel 30.

Instead of the adhesive tape 56, the inner panel 28 and the outer panel 30 can be connected to each other in any appropriate manner such as, but not limited to, staking, one or more beads of adhesive, mating snap-fitting structures, welding, etc.

FIG. 1 is a perspective view of an exemplary vehicle 12 configured as a sport-utility vehicle or a cross-over vehicle. However, alternate embodiments of the vehicle 12 can include any type of vehicle, including a passenger car, minivan, truck, all-terrain vehicle (ATV), semi-tractor, off-highway vehicle, aircraft, watercraft, etc.

In alternate embodiments, the rear door 16 can be omitted from the vehicle 12.

Instead of the front door 14, in alternate embodiments, the rear door 16 can include the sensor attachment scheme 10. In alternate embodiments, the rear door 16 can include a sensor attachment scheme 10 that is in addition to sensor attachment scheme 10 of the front door 14. Similarly a hatch or rear trunk lid can include the sensor attachment scheme 10.

What is claimed is:

1. A vehicle door, comprising:

an exterior panel that includes a first outer surface;

an inner panel mounted onto the first outer surface;

an outer panel mounted onto and covering the inner panel, the outer panel has a second outer surface, the outer panel covers a first portion of the first outer surface and exposes a second portion of the first outer surface such that the second outer surface and the second portion of the first outer surface form an exterior surface of the vehicle door;

a plurality of connectors fixed to and protruding from the inner panel and connected to the exterior panel;

a sensor housing mounted onto the inner panel, the sensor housing has an opening and a perimeter edge that surrounds the opening;

a sensor mounted within the sensor housing; and a sealing member connected to both of the perimeter edge of the sensor housing and the outer panel and forming a seal between the perimeter edge and the outer panel.

2. The vehicle door according to claim 1, wherein the sensor housing is spaced away from each of the connectors.

3. The vehicle door according to claim 2, wherein the inner panel includes a first mounting protrusion and a second mounting protrusion, the sensor housing includes a first end, a first mounting tab protruding from the first end and connected to the first mounting protrusion, a second end, and a second mounting tab protruding from the second end and connected to the second mounting protrusion.

4. The vehicle door according to claim 3, wherein the inner panel includes a first wall portion that abuts the outer panel and a second wall portion that is spaced away from the first wall portion and abuts the outer panel, the first mounting protrusion is located on the first wall portion, the second mounting protrusion is located on the second wall portion, and the sensor housing is mounted on and connected to the first mounting protrusion and the second mounting protrusion.

5. The vehicle door according to claim 1, wherein the exterior panel includes a first datum through hole, the inner panel includes a second datum through hole, and the outer panel includes a datum projection that extends through the first datum through hole and the second datum through hole.

6. The vehicle door according to claim 1, wherein the outer panel is a single contoured wall that is devoid of a doghouse, and the inner panel is a single contoured wall that is devoid of a doghouse.

7. The vehicle door according to claim 6, wherein the inner panel includes, a first wall portion that abuts the outer panel, a second wall portion that abuts the outer panel, a first raised wall portion that protrudes from both of the first and second wall portions, the first raised wall portion is spaced away from the outer panel at least one of the connectors is fixed to the first raised wall portion, a third wall portion that abuts the outer panel, a second raised wall portion that protrudes from each of the second and third wall portions, the second raised wall portion is spaced away from the outer panel.

8. The vehicle door according to claim 1, wherein the inner panel includes, a first wall portion that abuts the outer panel, a second wall portion that is spaced away from the first wall portion and abuts the outer panel, and a third wall portion that protrudes from each of the first wall portion and the second wall portion, and the third wall portion is spaced away from the outer panel.

9. The vehicle door according to claim 8, wherein at least one of the connectors is located on and fixed to the third wall portion.

10. The vehicle door according to claim 8, wherein the exterior panel includes a first datum through hole, the inner panel includes a second datum through hole in the third wall portion, and the outer panel includes a datum protrusion extending through the first datum hole and the second datum through hole.

11. The vehicle door according to claim 1, wherein each of the connectors is spaced away from the outer panel and protrudes from the inner panel in a direction that is away from the outer panel.

12. The vehicle door according to claim 1, wherein the inner panel includes an outer surface that faces the outer panel, an inner surface that faces the exterior panel, and a plurality of harness clips that protrude from the inner surface.

13. The vehicle door according to claim 1, wherein the sensor is a power hinge door sensor that is configured to output a signal that is indicative of the presence or absence of an object in a moving path of the vehicle door.

14. The vehicle door according to claim 1, wherein an adhesive connects the outer panel to the inner panel.

15. A vehicle door, comprising:

an exterior panel that includes an upper edge, the exterior panel terminates at the upper edge, a lower edge, the exterior panel terminates at the lower edge, and a first outer surface that extends from the upper edge to the lower edge;

an inner panel mounted onto the exterior panel, the inner panel is adjacent to the lower edge and spaced away from the upper edge;

an outer panel mounted onto and covering the inner panel, the outer panel is spaced away from the upper edge, the outer panel has an outer panel outer surface, the outer panel covers a first portion of the first outer surface and exposes a second portion of the first outer surface such that the outer panel outer surface and the second portion of the first outer surface form an exterior surface of the vehicle door;

a plurality of connectors fixed to and protruding from the inner panel and connected to the exterior panel;

a sensor housing mounted onto the inner panel and against the outer panel;

a sensor mounted within the sensor housing; and a seal abutting each of the outer panel and the sensor housing.

16. The vehicle door according to claim 15, wherein the sensor housing is spaced away from each of the connectors.

17. The vehicle door according to claim 16, further comprising:

a wire harness electrically connected to the sensor and extending away from the sensor housing, wherein the inner panel includes an inner surface facing the exterior panel, a first clip extending away from the inner surface, and a second clip extending from the inner surface and spaced away from and opposing the first clip, and the wire harness extends between and engages the first clip and the second clip.

18. A vehicle door, comprising:

an exterior panel that includes an upper edge configured to be adjacent to a window pane, the exterior panel terminates at the upper edge, a lower edge, the exterior panel terminates at the lower edge, and a first exterior surface that extends from the upper edge to the lower edge;

an inner panel mounted onto the exterior panel, the inner panel extends along the first exterior surface;

an outer panel mounted onto the inner panel, the outer panel includes a first edge and a second exterior surface, the first edge is spaced away from the upper edge and the lower edge, the outer panel covers the inner panel and a first portion of the first exterior surface that extends from the lower edge to the first edge, the outer panel exposes a second portion of the first exterior surface that extends from the upper edge to the first edge, the second exterior surface and the second portion of the first exterior surface collectively form an exterior surface of the vehicle door;

a plurality of connectors fixed to and protruding from the inner panel and connected to the exterior panel;

a sensor housing adjacent the inner panel;

a sensor located within the sensor housing;

the outer panel has an inner surface and the inner panel has an opposing surface that is adhered to the inner surface, the outer panel and the exterior panel enclose the inner panel, the sensor housing is sealed against the outer panel, and
the connectors are spaced away from the outer panel.

19. The vehicle door according to claim 18, wherein
the sensor housing is spaced away from each of the
connectors.

* * * * *